(12) United States Patent
Cloonan et al.

(10) Patent No.: US 12,028,185 B2
(45) Date of Patent: Jul. 2, 2024

(54) METHODS, SYSTEMS, AND DEVICES FOR STEERING PACKETS ACROSS MULTIPLE ACCESS TECHNOLOGIES

(71) Applicant: ARRIS Enterprises LLC, Suwanee, GA (US)

(72) Inventors: Thomas Jay Cloonan, Lisle, IL (US); Jeffrey Joseph Howe, West Chicago, IL (US); Cillian O'Tuama, Cork (IE); Greg John Gohman, Beaverton, OR (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/161,386

(22) Filed: Jan. 28, 2021

(65) Prior Publication Data

US 2021/0234729 A1  Jul. 29, 2021

Related U.S. Application Data

(60) Provisional application No. 62/967,107, filed on Jan. 29, 2020.

(51) Int. Cl.
*H04L 12/28* (2006.01)
*H04J 13/00* (2011.01)
(Continued)

(52) U.S. Cl.
CPC .......... *H04L 12/5601* (2013.01); *H04L 12/66* (2013.01); *H04L 2012/5604* (2013.01); *H04L 2012/562* (2013.01)

(58) Field of Classification Search
CPC ............ H04L 12/5601; H04L 12/2858; H04L 65/1016; H04L 12/66; H04L 45/24;
(Continued)

(56) References Cited

U.S. PATENT DOCUMENTS

| 6,252,862 B1 * | 6/2001 | Sauer | H04L 69/165 |
| | | | 370/331 |
| 9,253,078 B2 * | 2/2016 | Abbas | H04L 45/125 |

(Continued)

FOREIGN PATENT DOCUMENTS

| EP | 3110076 A1 * | 12/2016 | ......... H04L 12/2863 |
| EP | 3110076 A1 | 12/2016 | |

(Continued)

OTHER PUBLICATIONS

International Search Report and Written Opinion Re: Application No. PCT/US2021/015533 (dated Apr. 21, 2021).

(Continued)

*Primary Examiner* — Edan Orgad
*Assistant Examiner* — Vanneilian Lalchinthang
(74) *Attorney, Agent, or Firm* — Wenderoth, Lind & Ponack, L.L.P.

(57) ABSTRACT

Systems and methods for steering data packets among a plurality of available network devices. A device connected to a wide area network through multiple network interfaces may dynamically select which network interface to use to transmit individual packets sent to, and received from, client devices over a local area network.

18 Claims, 13 Drawing Sheets

(51) Int. Cl.
*H04L 12/54* (2022.01)
*H04L 12/66* (2006.01)
*H04L 29/06* (2006.01)
*H04W 12/08* (2021.01)
*H04W 40/02* (2009.01)
*H04L 12/70* (2013.01)

(58) Field of Classification Search
CPC ..... H04L 69/14; H04L 67/142; H04L 69/161; H04L 2012/5604; H04L 2012/562; H04L 63/101; H04L 47/40; H04L 69/165; H04W 12/08; H04W 74/02; H04W 40/02; H04W 12/03; H04W 12/06; Y02D 30/50; H04M 7/125; H04B 7/02
USPC .......................................................... 370/389
See application file for complete search history.

(56) References Cited

U.S. PATENT DOCUMENTS

| | | | | |
|---|---|---|---|---|
| 10,154,147 | B2* | 12/2018 | Cook | H04M 7/0069 |
| 2009/0238074 | A1* | 9/2009 | Vasseur | H04L 45/125 |
| | | | | 370/237 |
| 2012/0287855 | A1* | 11/2012 | Kishigami | H04L 1/0071 |
| | | | | 370/328 |
| 2013/0128738 | A1* | 5/2013 | Cohen | H04L 45/125 |
| | | | | 370/235 |
| 2015/0063805 | A1* | 3/2015 | Lamb | H04Q 11/0067 |
| | | | | 398/58 |
| 2017/0013441 | A1* | 1/2017 | Manik | H04L 12/66 |
| 2018/0103123 | A1* | 4/2018 | Skog | H04L 69/14 |
| 2019/0028577 | A1* | 1/2019 | D?Souza | H04L 45/02 |
| 2019/0182146 | A1* | 6/2019 | Skog | H04L 47/28 |
| 2019/0296969 | A1* | 9/2019 | Zimny | H04W 12/06 |
| 2019/0297651 | A1* | 9/2019 | Beck | H04L 12/2858 |
| 2019/0306052 | A1* | 10/2019 | Cheng | H04L 47/122 |
| 2019/0335520 | A1* | 10/2019 | Dion | H04L 69/14 |
| 2021/0204169 | A1* | 7/2021 | Sevindik | H04W 40/12 |

FOREIGN PATENT DOCUMENTS

| | | | | |
|---|---|---|---|---|
| EP | 2728802 B1 * | 8/2020 | ......... | H04L 12/2863 |
| WO | 2017164172 A1 | 11/2017 | | |
| WO | WO-2017194172 A1 * | 11/2017 | ............. | H04L 43/16 |

OTHER PUBLICATIONS

Ballantyne Kelvert et al: "Bandwidth aggregation using MPTCP and WMN gateways", 2016 IEEE Canadian Conference on Electrical and Computer Engineering ( CCECE) , IEEE, May 15, 2016 (May 15, 2016), pp. 1-6.

International Preliminary Report on Patentability dated Jul. 28, 2022 in International (PCT) Application No. PCT/US2021/015533.

Office Action dated Sep. 7, 2023 in corresponding Canadian Application No. 3,166,607.

\* cited by examiner

METHODS, SYSTEMS, AND DEVICES FOR STEERING PACKETS ACROSS MULTIPLE ACCESS TECHNOLOGIES

CROSS REFERENCE TO RELATED APPLICATIONS

This application claims the benefit of U.S. Provisional Patent Application Ser. No. 62/967,107 filed Jan. 29, 2020 and entitled "METHODS, SYSTEMS, AND DEVICES FOR STEERING PACKETS ACROSS MULTIPLE ACCESS TECHNOLOGIES," the complete disclosure of the above application is hereby incorporated by reference for all purposes.

TECHNICAL FIELD

The present invention relates to methods, apparatuses, and systems for use in communications that provide for steering of packets across multiple access technologies.

BACKGROUND

There has been a significant increase in the availability of high-speed communications networks over the past several decades. The proliferation of these communications networks, and the expansion of service within these networks, has resulted in a corresponding increase in the adoption of many new computing technologies by consumers and businesses.

Some communications companies have deployed extensive fiber optic cable networks, which have significantly increased communication bandwidth for carrying data, video, and voice traffic as compared to copper coaxial cable networks. Multiple fiber topologies have been deployed both domestically and internationally, including fiber-to-the-neighborhood or fiber-to-the-node (FTTN), fiber-to-the-curb (FTTC), and fiber-to-the-premises (FTTP). In some of these topologies where a complete fiber pathway to the premises is not provided, individual copper cables may complete connections to the premises or to individual units in multi-unit premises. Generally, FTTP has greater communication bandwidth than FTTN or FTTC, but has increased capital investment costs in deploying the fiber optic cable. Optical networks can include active optical networks (AON) in which electrically powered equipment routes customer-specific signals only to the intended customer, and/or passive optical networks (PON) in which unpowered optical splitters are used to serve a plurality of customers with a single optical fiber. In a PON, downstream signals intended for a single customer are broadcast to each customer premises, with encryption and premise-based filtering used to avoid eavesdropping of another customer's communications. In a PON, upstream signals are typically combined using time-division multiple access or another multiple-access protocol.

Some communications companies, typically cable companies with already existing coaxial cable networks, have allocated increasing bandwidth on their coaxial lines for downstream and upstream data transfers. Cable modem boxes installed within the customer premises communicate with cable modem boxes upstream (at the cable company's headquarters or at a headend site) using various networking technologies, enabling computing devices at the customer premises to communicate with remote devices via the Internet. To increase downstream and upstream data rates, the DOCSIS (Data Over Cable Service Interface Specification) standard, beginning with version 3.0, includes techniques for channel bonding, in which multiple downstream channels are combined together to increase data rates. For example, four, eight, sixteen, or more channels can be combined together either on the downlink or the uplink to provide increased data rates over a signal channel. This has permitted data rates to increase from about 40 Mbit/sec to speeds on the order of 1 Gbit/sec, particularly in the downstream direction (i.e., from the headend site toward a customer premise).

Coaxial cable and fiber optic cable are not mutually exclusive. Some communications operators utilize a hybrid fiber-coaxial (HFC) system in which communications links between the headend are coupled to neighborhood nodes via optical fibers, and the buildings within each neighborhood are served by a shared copper coaxial cable trunk/line system terminating at the neighborhood node. The node thus acts as an optical/coaxial conversion point. One area of growing interest is replacing the coaxial portion of a HFC network with a single-fiber PON, and using Radio Frequency over Glass (RFoG) networking to provide forward-path and return-path communications at different optical wavelengths within the single fiber.

Advances in technology have also resulted in deployment of technology within the customer premises. For example, increasing desirability for wireless communication has resulted in a proliferation of devices implementing the IEEE 802.11 family of standards. Wireless access points (APs) and routers, implemented either as standalone devices or within customer premises equipment provided by communications companies, has utilized available unlicensed radio spectrum in the ISM (industrial, scientific, and medical) and NII (National Information Infrastructure) bands, typically at about 2.4 GHz and 5 GHZ respectively.

Of course, another major area of growth has been in cellular radio networks, in which cellular base stations provide network access to user equipment (cellular telephones, smartphones, some cellular-enabled laptops and other computing devices). One standard currently utilized is the LTE (Long Term Evolution) standard, which defines the functionality and communications protocols for devices at the base station and for the user equipment. The growth in wireless service demands has resulted in not only an increase in the number of conventional "macro-cell" base stations and in the communication capacity thereof, but also the deployment of "small cell" and other limited range base stations that serve particularly congested or underserved areas, often in urban environments.

BRIEF DESCRIPTION OF THE DRAWINGS

The accompanying drawings, which are incorporated in and constitute a part of the specification, illustrate embodiments of the inventive concepts and, together with the description, serve to explain principles of the inventive concepts.

DETAILED DESCRIPTION

One typical scenario in which the technologies and communications networks discussed above are used is in a customer accessing a Wide Area Network (WAN) such as the Internet. The technologies and communications networks discussed above permit access to the WAN through one or more access networks, each of which may use different communications protocols and/or interfaces.

Figure 1:
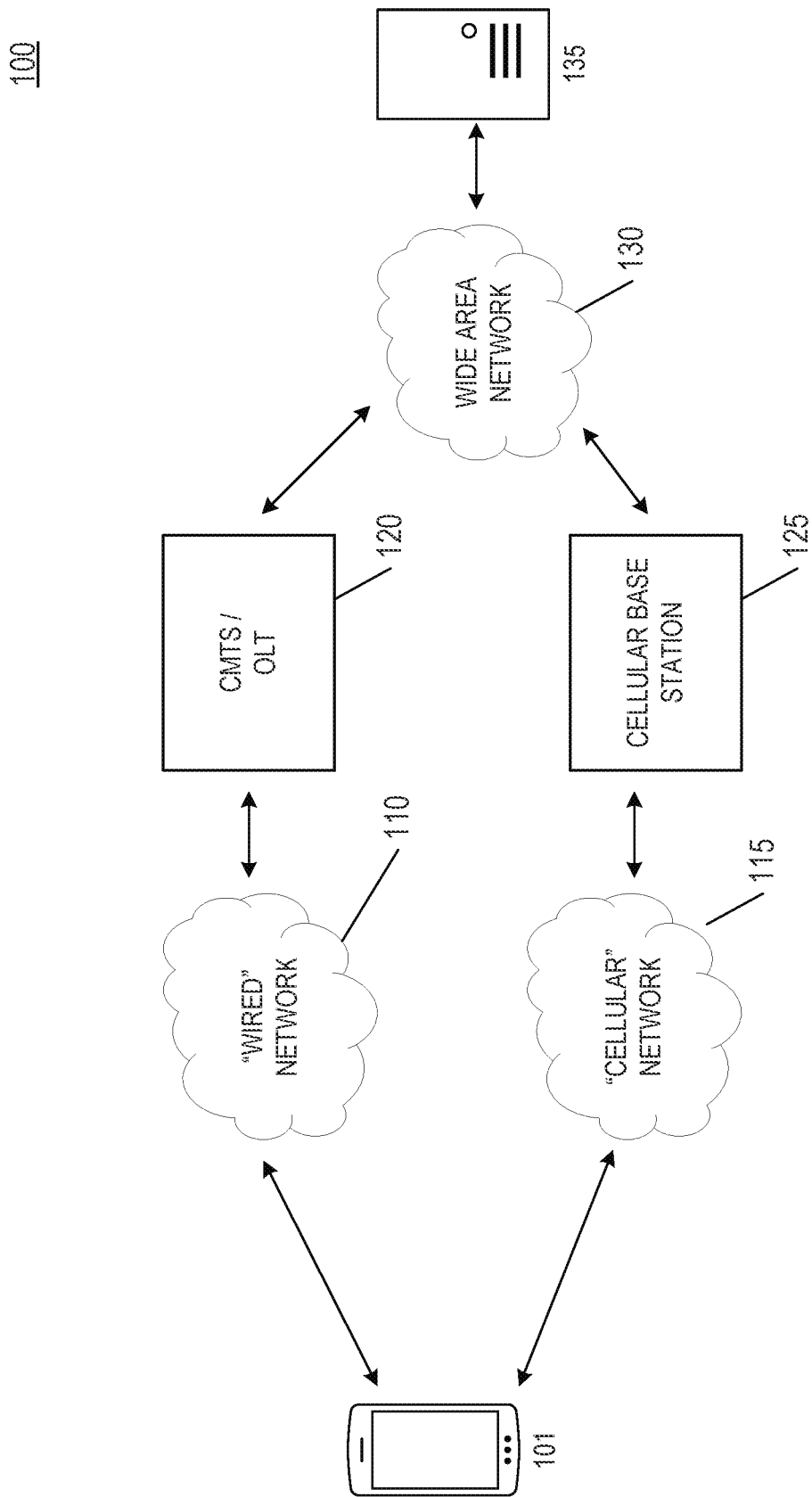
FIG. 1 is a schematic block diagram illustrating a conventional packet-based system in which multiple access networks are present.

For example, a customer may subscribe to service from a cellular network provider for LTE or other cellular service. The same customer may also subscribe to a wired network (e.g., the coaxial and optical systems discussed above) either from the same provider or from another provider, depending on local availability. Some devices can be configured to use multiple connection interfaces and multiple access networks to connect with remote networks and devices. The most common example of such a device is a smartphone. FIG. 1 illustrates a conventional system 100. A user may configure a smartphone 101 to connect to a "wired" access network 110 (typically, via Wi-Fi) while in the customer premises, and the smartphone 101 may also be configured to connect to a cellular network 115 both within the customer premises and outside of the customer premises.

While in the customer premises, uplink and downlink data to and from the Internet is typically routed to the "wired" access network 110 (which may include, for example a PON/fiber optic network and/or a HFC/coaxial cable network) via a Wi-Fi interface of the smartphone 101. Taking uplink data to be transmitted to a remote server 135 as an example, the uplink data from the smartphone 101 may be communicated wirelessly to a Wi-Fi router (e.g., as an RF transmission) which may convert the transmission to an electrical signal that is passed to customer premises equipment (CPE) that is appropriate for the type of "wired" access network 110 to which the customer subscribes. If, for example, the "wired" access network 110 is a PON/fiber optic network, then the CPE may include an optical network terminal (ONT) or optical network unit (ONU) that converts the uplink data to an optical signal. Conversely, when the "wired" access network is a HFC/coaxial network, the CPE may include a cable modem, which may convert the uplink data to an appropriate RF frequency for transmission via a coaxial cable. In HFC configurations, an upstream conversion device may convert the RF signal to an optical signal as the case may be.

Regardless, the uplink data may be received by a termination device 120 on the opposite end of the "wired" access network 110 from the customer premises. The termination device 120 may be a cable modem termination system (CMTS) in coaxial/HFC configurations, or may be a optical line terminal (OLT) in fiber optic/PON configurations. The termination device 120 may be located in a central office. Generally, the basic function of the termination device 120 is to control bi-directional flow of information to and from the customer premises via the "wired" access network 110. For example, the termination device 120 may perform frequency and/or protocol conversions to allow communication between the WAN 130 and the "wired" access network 110. In addition, as the termination device 120 is typically coupled to multiple customer premises in a point-to-multipoint network, the termination device 120 may control or schedule transmission among the devices at the customer premises using e.g., multiple-access protocols and/or multiplexing. During run-time, the CPE may go through an authentication process with a termination device 120 to verify that permission has been given for the CPE to provide one or more services to a subscriber. Once the authentication process has been successfully completed, the termination device 120 may deliver one or more services to the CPE according to a subscription associated with the CPE.

While the smartphone 101 is within the customer premises, or more accurately within the transmission range of the wireless equipment communicatively coupled to the CPE, uplink and downlink data to and from the Internet is typically routed to the "wired" access network 110 to reduce usage of the cellular network 115. Historically, this has been because of the greater speed, availability, and capacity offered by the wired-based networks, as well as because access to the cellular network has been subscribed to on a per-data rate basis. However, gaps between wired networks and cellular networks with respect to speed, availability, and capacity have diminished and continues to diminish. Within the customer premises, the cellular network 115 is typically used to deliver voice and SMS/text messages, although there has been some effort to offload these from cellular service to data service (e.g., data-based video chat, voice chat or "text" messages that utilizes packet-based data instead of cellular counterparts).

Outside of the customer premises, and/or responsive to a user request or failure within the "wired" access network, a cellular interface of the smartphone 101 may be used to provide data services to the smartphone. Again, using uplink data as an example, data may be communicated via an RF transmission from the smartphone 101 via the cellular network 115 to the cellular base station 125, which may perform a similar role as the OLT and/or CMTS. The cellular base station 125 may receive the RF signal from the smartphone 101, convert it via one or more radios, baseband units, or the like, and may transmit it toward the remote server 135 via the WAN 130.

Although the example device of FIG. 1 is a smartphone 101, other devices such as tablets, computers, televisions, printers, medical equipment, and so on may be present within a customer premises and may communicate via one or both of the example access networks shown. Additionally, in some examples, more than two access networks may be present, or access networks different than those discussed herein may be present, such as WiMAX or other "last-mile" access networks or satellite communication networks.

While access to multiple access networks provides multiple different communication connections to external networks and/or services, taking advantage of the full capabilities of the multiple access networks present challenges. For example, owing in part to early design choices, one major network protocol (transmission control protocol, or TCP) that is used nearly ubiquitously within access networks contemplates only the notion of a single connection between two hosts, relying on a 5-tuple of source address, source port number, destination address, destination port number, and protocol. Because the smartphone 101 may be assigned different addresses within each access network, packets intended for the smartphone 101 indicating a certain destination address may be successfully transmitted only via one of the access networks. As such, a handoff of a session between the smartphone 101 and the remote device 135 from the "wired" access network 110 to the cellular access network 115 is not possible or practicable, and the session will be broken.

One area of interest is multipath TCP (MPTCP), which is intended to add support for multiple transport paths between two endpoints. In theory, this will permit data to be transmitted via the "wired" access network 110 and the cellular access network 115 in parallel, which may increase throughput and/or improve the robustness of sessions (by providing failover and redundancy). If MPTCP is in use, both sides (e.g., the smartphone 101 and the remote server 135) need to be configured to recognize a distinction between a TCP session itself and any specific "connection" used by that session. Once connected via a first TCP session, either the smartphone 101 or the remote server 135 may initiate another TCP connection to the other side, so long as the address and/or port at one end or the other of the connection must differ. Once two or more connections have been established, it is up to the smartphone 101 and the remote server 135 on each end to decide how to split traffic between the connections, though one connection may be marked specifically as a fallback for use only in the absence of any other operable connection.

The difficulty in MPTCP is that the vast majority of devices in a communications network are not yet configured to use such paths, and successful deployment requires not only the end devices be configured to talk via MPTCP, but also intermediary devices in each path be non-hostile to such communications: as it is, some devices (e.g., routers, but also network address translation boxes) may frustrate instantiation of additional connections between the end devices. As MPTCP is still in its relative infancy, no significant effort has been made to articulate methods for splitting traffic between the connections.

Separately, there has been some effort to utilize multiple access networks to increase data rates, for example where each access network is by itself insufficient or subject to congestion. A recent feature of the LTE standard called Local WiFi Assist (LWA) provides some capability for using LTE within the unlicensed Wi-Fi spectrum, enabling aggregation of LTE and Wireless Local Area Network (WLAN) resources so as to split a single IP flow across multiple access technologies. As the LTE base station and access network controls splitting of the data flow between the LTE network and the local Wi-Fi network, there is the potential for performance gains, and the fact that two different networks are being used is largely invisible to the user or the application. However, LWA applies in the downlink direction only, and the LTE standard does not permit splitting uplink data across multiple paths. A different feature within the LTE standard called LWIP permits the usage of a security tunnel on a Wi-Fi network, which may provide load balancing between LTE and Wi-Fi. However, this feature does not allow splitting a data flow across access technologies, and as such does not provide the benefits of LWA.

In view of the limitations currently present in the art, the present disclosure provides methods and systems for steering packets across multiple media and across multiple access technologies.

Figure 2:
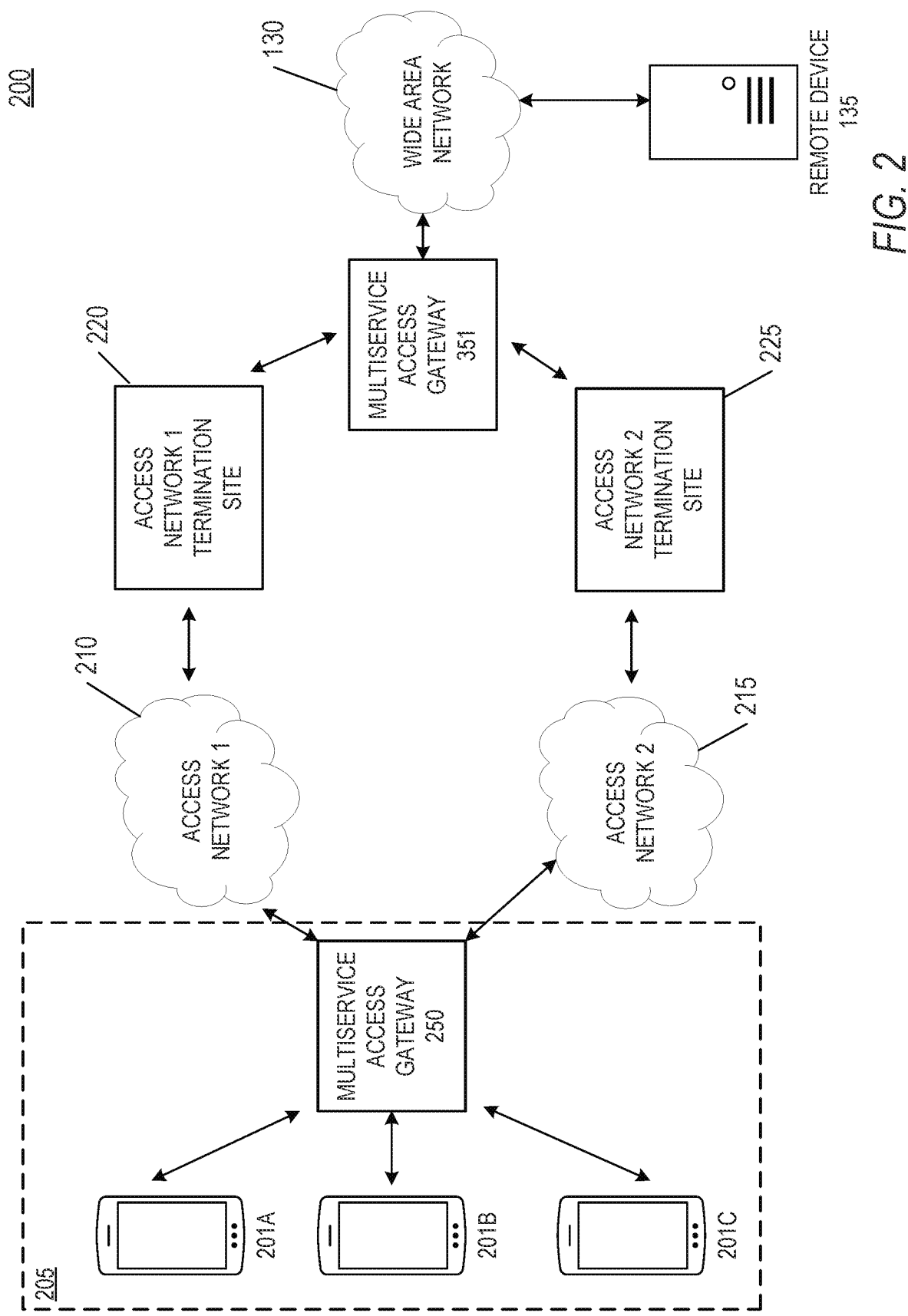
FIG. 2 is a schematic block diagram illustrating an example packet steering system according to some embodiments of the present inventive concepts.

FIG. 2 illustrates an example system 200 in which packets may be steered across multiple access technologies. Present within system 200 of FIG. 2 is a first multiservice access gateway 250, which may also be referred to herein as an aggregator or as a customer premises multiservice access gateway. The customer premises multiservice access gateway 250 may, in some embodiments, connect (e.g., wirelessly using a wireless connection that implements an IEEE 802.11 or IEEE 802.16 standard, and/or via a wired connection that implements IEEE 802.3 standards) with one more user devices 201A, 201B, 201C present within a customer premises 205 (e.g., residence, office, hotel, hospital, and so on). In some embodiments, devices within the customer premises 205, such as wireless access points, bridges, routers, switches, adapters, and so on may be present and may facilitate communication between the user devices 201 and the customer premises multiservice access gateway 250, although none are shown in FIG. 2. As an example, one of the user devices 201 present within the customer premises 205 may lack a wireless network interface card (NIC), and as such may not be Wi-Fi compatible. However, the user device 201 may have a NIC providing for a wired Ethernet connection. The user device 201 may be coupled via the available Ethernet connection and NIC to a wireless adapter that facilitates a wireless connection with the customer premises multiservice access gateway 250. In some embodiments, the customer premises multiservice access gateway 250 may be configured to establish a local area network (LAN) among the user devices 201 present in the customer premises 205.

The customer premises multiservice access gateway 250 may, in some embodiments, also include interfaces to connect to two or more access networks 210 and 215, which may be e.g., optical (PON and/or AON), coaxial cable, HFC, wireless, cellular, satellite, or any other access network. In some embodiments, the customer premises multiservice access gateway 250 may include physical interfaces to the access networks 210 and 215 including physical layer (PHY) semiconductor chips, devices, and/or interfaces. For example, if one of the access networks 210 and 215 is a coaxial cable network, an input/output of the multiservice access gateway 250 may be a connector configured to receive a coaxial cable connector (e.g., 7/16 DIN connector, BNC connector, F-type connector, and so on). As another example, if one of the access networks is a cellular network, the customer premises multiservice access gateway 250 may include a cellular antenna and radio, which may convert uplink signals to cellular frequencies for transmission via the cellular antenna and may also convert downlink signals received via the cellular antenna from cellular frequencies. As with the CMTS, OLT, and cellular base station examples discussed with reference to FIG. 1, each of the access networks 210 and 215 may have at least one respective termination site 220, 225 which is configured to convert signals from carriage over the respective access network 210, 215 to signals for carriage over the WAN 130, and vice versa. The WAN 130 and the remote server 135 are functionally similar to those discussed with reference to FIG. 1, and need not be elaborated upon further herein.

In some embodiments, instead of the customer premises multiservice access gateway 250 having PHY interfaces with the one or more access networks, the multiservice access gateway 250 may be communicatively coupled to the access networks via CPE, such as a cable modem or ONT/ONU. In such embodiments, the customer premises multiservice access gateway 250 may appear as a router with multiple WAN ports.

Figure 9A:
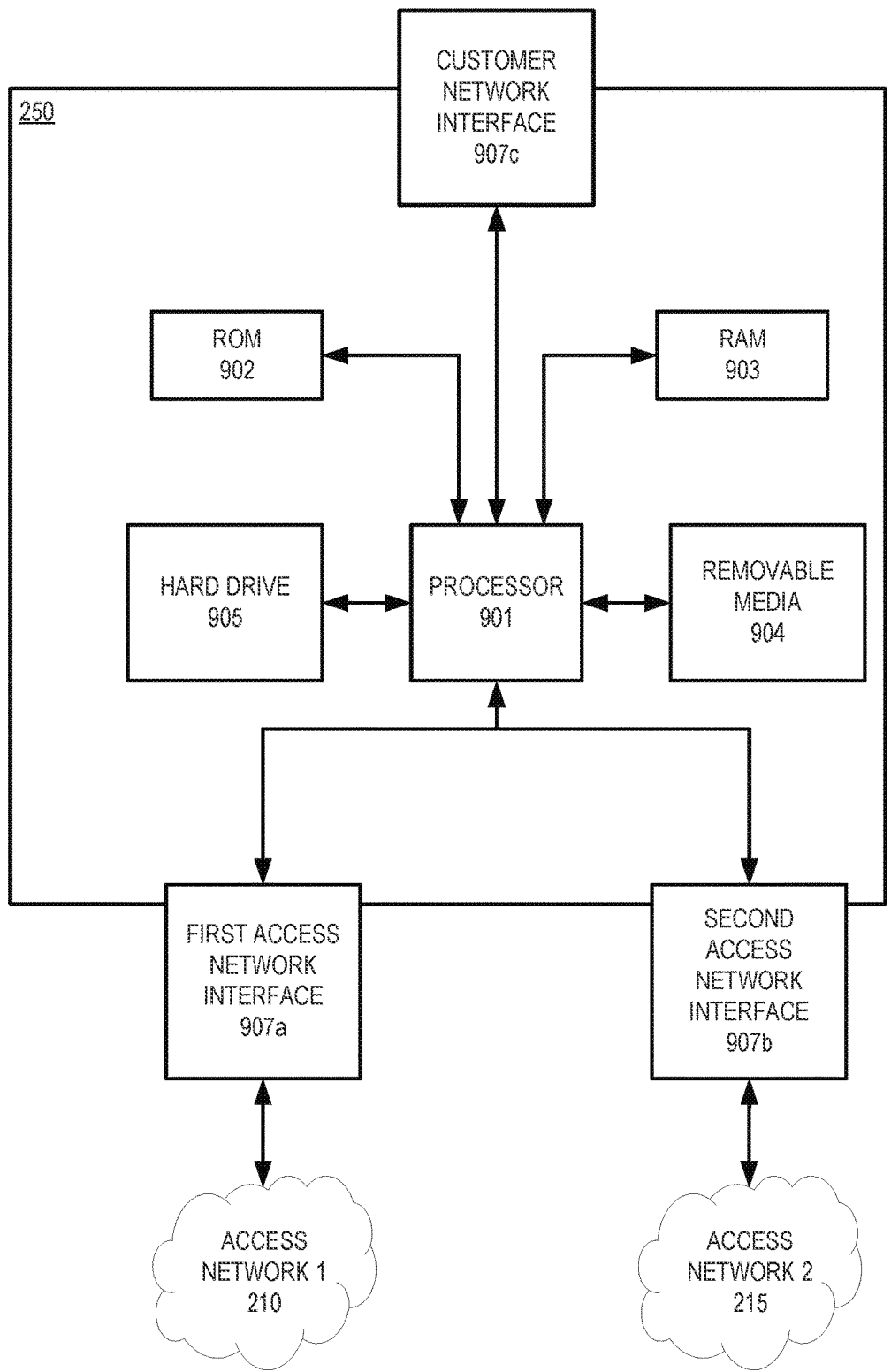
FIGS. 9A-9B are schematic block diagrams illustrating components of example multiservice access gateways according to some embodiments of the present inventive concepts.
Figure 9B:
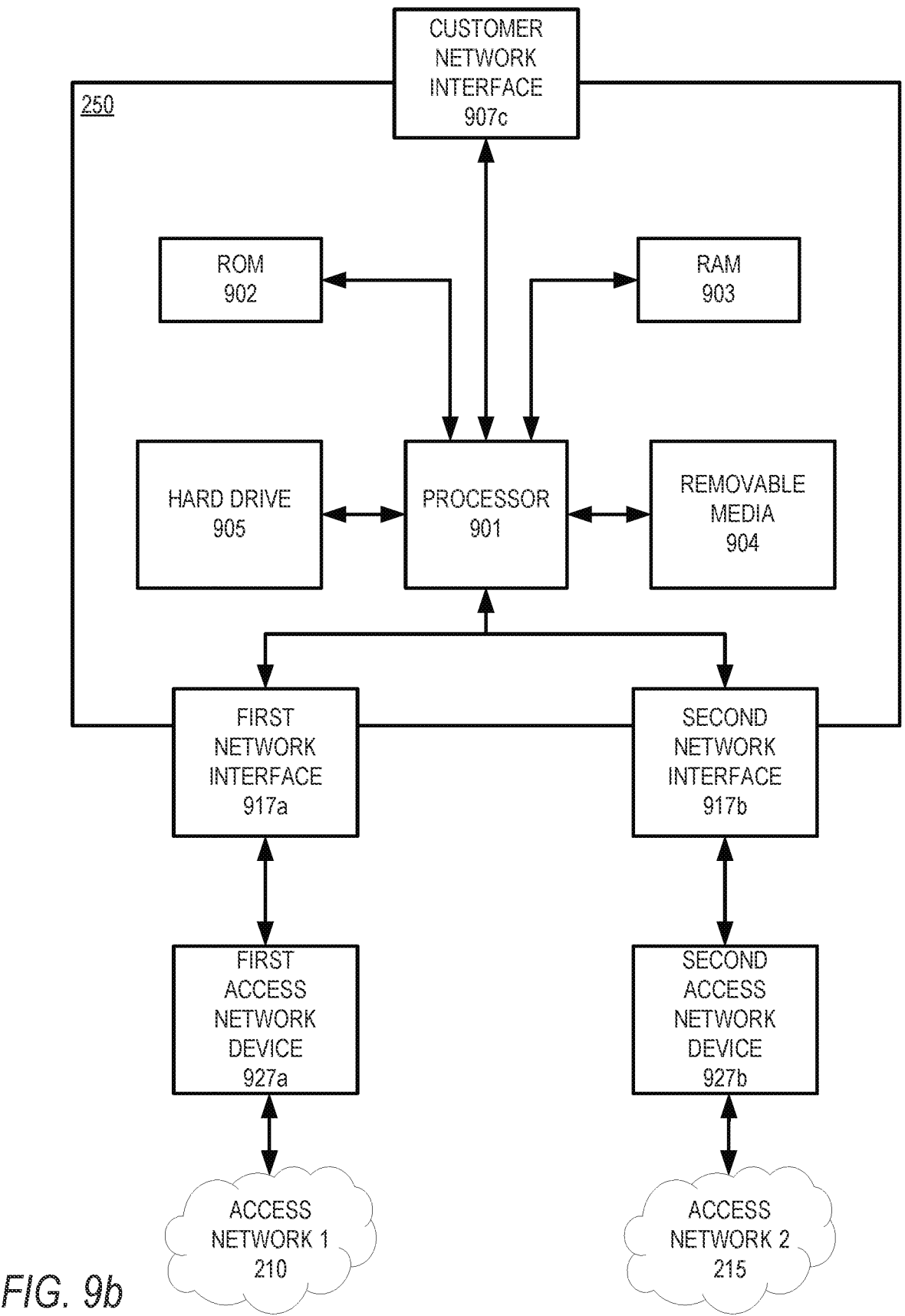

FIGS. 9A and 9B illustrate example implementations of the customer premises multiservice access gateway 250. A customer premises multiservice access gateway 250 may include one or more processors 901, which may execute instructions of a computer program to perform any of the features of the customer premises multiservice access gateway 250 described herein. The instructions may be stored in any type of computer-readable medium or memory, to configure the operation of the processor 901. For example, instructions may be stored in a read-only memory (ROM) 902, random access memory (RAM) 903, removable media 904, such as a Universal Serial Bus (USB) drive, compact disk (CD) or digital versatile disk (DVD), floppy disk drive, or any other desired electronic storage medium. Instructions may also be stored in an attached (or internal) hard drive 905. The customer premises multiservice access gateway 250 may be configured to provide output to one or more output devices (not shown) such as printers, monitors, display devices, and so on, and receive inputs, including user inputs, via input devices (not shown), such as a remote control, keyboard, mouse, touch screen, microphone, or the like.

As seen in FIG. 9A, in some embodiments the customer premises multiservice access gateway 250 may also include a first access network interface 907a and a second access network interface 907b, which may include physical interfaces to the access networks 210 and 215 including physical layer (PHY) semiconductor chips, devices, and/or interfaces. As in the example provided above, if the first access networks 210 is a coaxial cable network, the first access network interface 907a may be a connector configured to receive a coaxial cable connector (e.g., 7/16 DIN connector, BNC connector, F-type connector, and so on). If the access network 215 is a cellular network, the second access network interface 907b may include a cellular antenna and radio.

As seen in FIG. 9B, in some embodiments the customer premises multiservice access gateway 250 may also include a first network interface 917a and a second network interface 907b, which may be similar interfaces (e.g., Ethernet ports, USB ports or other input/output interfaces). The multiservice access gateway 250 of FIG. 9B may be communicatively coupled to the access networks via a first access network device 927a and a second access network device 927b, which may be (as examples), a cable modem, a cellular modem or hotspot device, or an ONT/ONU. These network devices 927a, 927b may connect to their respective access networks 210, 215 via appropriate equipment.

The customer premises multiservice access gateway 250 may be configured to select between one or more of the access networks 210 and 215 to deliver one or more packets or series of packets (e.g., packet stream, packet flow, and so on). The customer premises multiservice access gateway 250 may receive information from devices within the access networks 210 and 215 (e.g., such as the termination site 220, 225 devices and/or other devices) regarding the network status, congestion, maximum predicted capacity, maximum predicted data rate, and so on, and may make a determination as to which network from among the access networks 210 and 215 is to be used in delivering the one or more packets to the WAN 130. This information may be actively received (e.g., via a scheduled or unscheduled transmission), or may be inferred and predicted from analysis of data transmissions via the access network 210 over time. For example, the customer premises multiservice access gateway 250 may determine from analysis that congestion resulting in low data rates occurs on a recurring interval such as every evening or every weekend morning, and may use this determination as part of determining which access network 210, 215 to select for a given packet or series of packets.

In some embodiments, data may be received by the customer premises multiservice access gateway 250 providing a schedule indicating which access network is to be used (e.g., preferentially or exclusively) at certain times or for certain durations.

Additionally and alternatively, the customer premises multiservice access gateway 250 may receive information from devices within the customer premises 205 regarding the application, status, or usage of data by each user device 201, and may make determination as to which network from among the access networks 210 and 215 is to be used in delivering the one or more packets to the WAN 130. For example, if user device 201A is engaging in video streaming, it may be beneficial for packets transmitted from the WAN 130 to be received via the less congested and/or higher data rate network from among the access networks 210 and 215, and as such transmission of packets to the WAN 130 from user device 201A may be steered to the less congested or higher data rate access network. Conversely, if user device 201B is engaging in an activity requiring a lower data rate than streaming video (e.g., reading web sites), the user device 201B or more specifically a user thereof may be momentarily less concerned with data speeds, and as such transmission of packets to the WAN 130 from user device 201B may be steered to the more contested access network and/or the access network having lower data rates.

In some embodiments, the customer premises multiservice access gateway 250 may act as a load balancer, transmitting a first portion of packets via a first of the access networks 210, and a second portion of packets via a second of the access networks 215 (and so on, in view of the fact that the number of access networks 210 and 215 in FIG. 2 is merely an example). Present in the system of FIG. 2 is a second multiservice access gateway 351, which may be located at a site operated by and/or controlled by a network provider (e.g., at a headend location, central office, or the like). The second multiservice access gateway 351 may be referred to herein as a provider multiservice access gateway.

Each of the termination sites 220 and 225 may be configured to forward packets received therefrom to the provider multiservice access gateway 351, which may receive packets or streams of packets from each termination site and forward them to the WAN 130.

In some embodiments, and as will be appreciated by the relative symmetry of FIG. 2, the provider multiservice access gateway 351, may be configured to steer downstream data from the remote server 135 intended for a user device 201 to either the access network 210 or the access network 215. Furthermore, in some embodiments the downstream data may be split by the provider multiservice access gateway 351 into packet streams transmitted across access networks 210 and 215 to the customer premises multiservice access gateway 250, which may re-sequence the separately transmitted packets into a single packet stream prior to transmission toward the customer premises 205 and user device 201.

Given that there may be different data rates within the access networks 210 and 215, a series of sequential packets may be transmitted via the different networks such that a later-in-series packet may arrive at one of the multiservice access gateways 250, 351 before an earlier-in-series packet. For example, a second packet intended for the remote server 135 may arrive at the provider multiservice access gateway 351 prior than a first packet. Thus, each of the multiservice access gateways 250, 351 may act as a re-sequencer. There are multiple techniques which may be considered to provide such re-sequencing. For example, in some embodiments, a packet may be encapsulated into a larger structure by a first of the multiservice access gateways 250, 351 for transmission via the selected access network 210 or 215. The larger structure may be received by the second of the multiservice access gateways 250, 351, which may then remove the packet from the larger structure for transmission toward the user device 201 or the WAN 130. Alternatively, a first of the multiservice access gateways 250, 351 may include information in the packet header of the packet, which may be read by the second of the multiservice access gateways 250, 351 in packet re-sequencing. A third method would be to infer packet order from information already in the TCP header, such as an octet. One or more of these methods may be used by the plurality of multiservice access gateways 250, 351.

The system 200 of FIG. 2 may permit user devices 201 and a remote device 135, none of which might be multi-path enabled, to nevertheless communicate using a multi-path connection. This multi-path connection may be managed by and terminated at customer premises multiservice access gateway 250 and provider multiservice access gateway 351.

Figure 3:
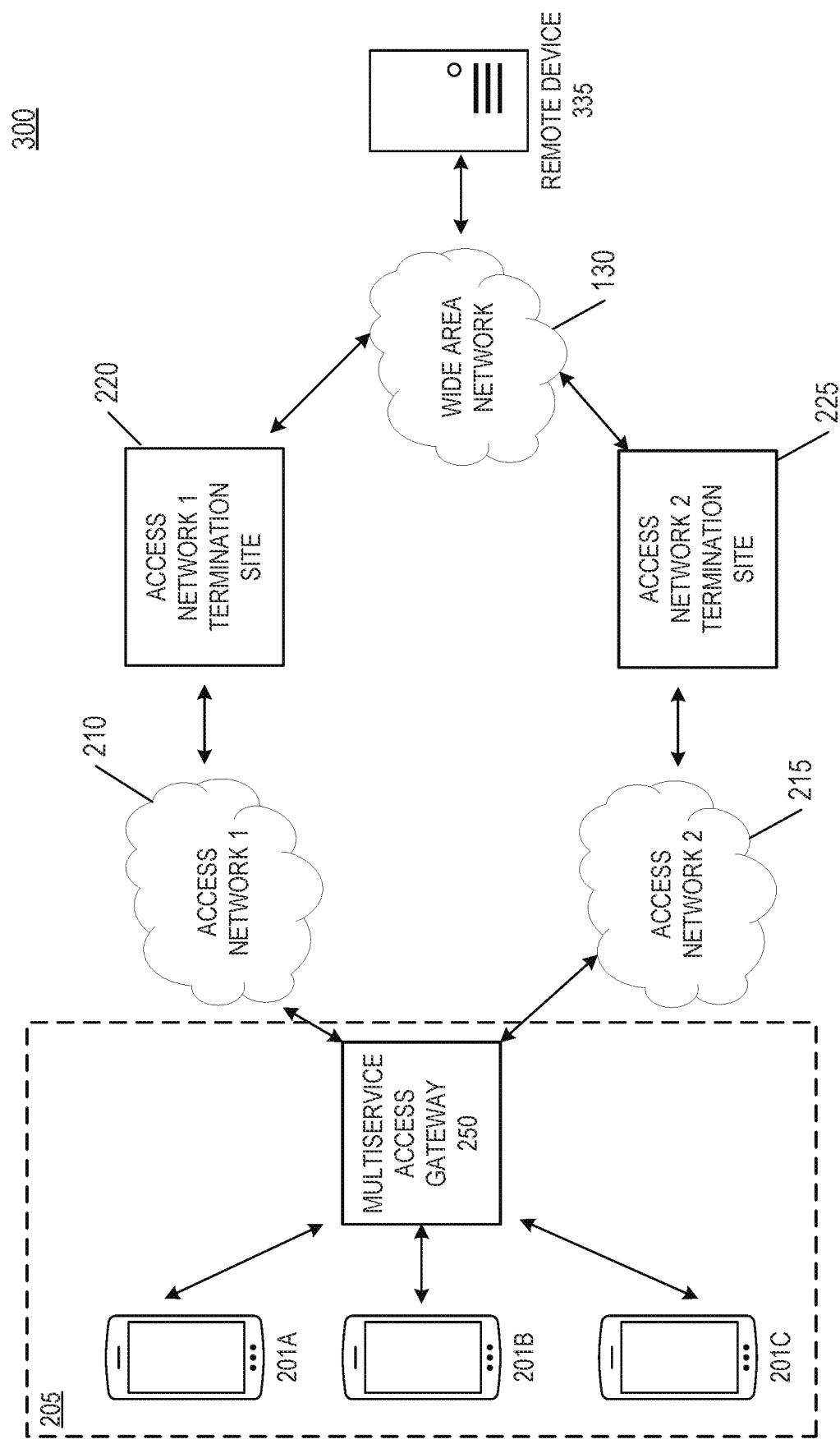
FIG. 3 is a schematic block diagram illustrating an example packet steering system according to some embodiments of the present inventive concepts.

FIG. 3 illustrates an example system 300 in which a remote device 335 may be configured to receive multiple streams of packets via the WAN 130. For example, the remote device 335 may be enabled with multi-path TCP. Thus, some embodiments of the present disclosure may enable user devices 201, which might not be multi-path TCP enabled, to communicate via the customer premises multiservice access gateway 250 with a device that is multi-path TCP enabled using a multi-path TCP connection that is managed and terminated by the multiservice access gateway 250.

One further potential benefit of the system 200 over the system 300 is that error correction may be performed on a per access technology basis prior to transmission of the combined stream of packets via the WAN 130, although it is envisioned that error correction can be handled in the system 300 of FIG. 3 appropriately.

Figure 4:
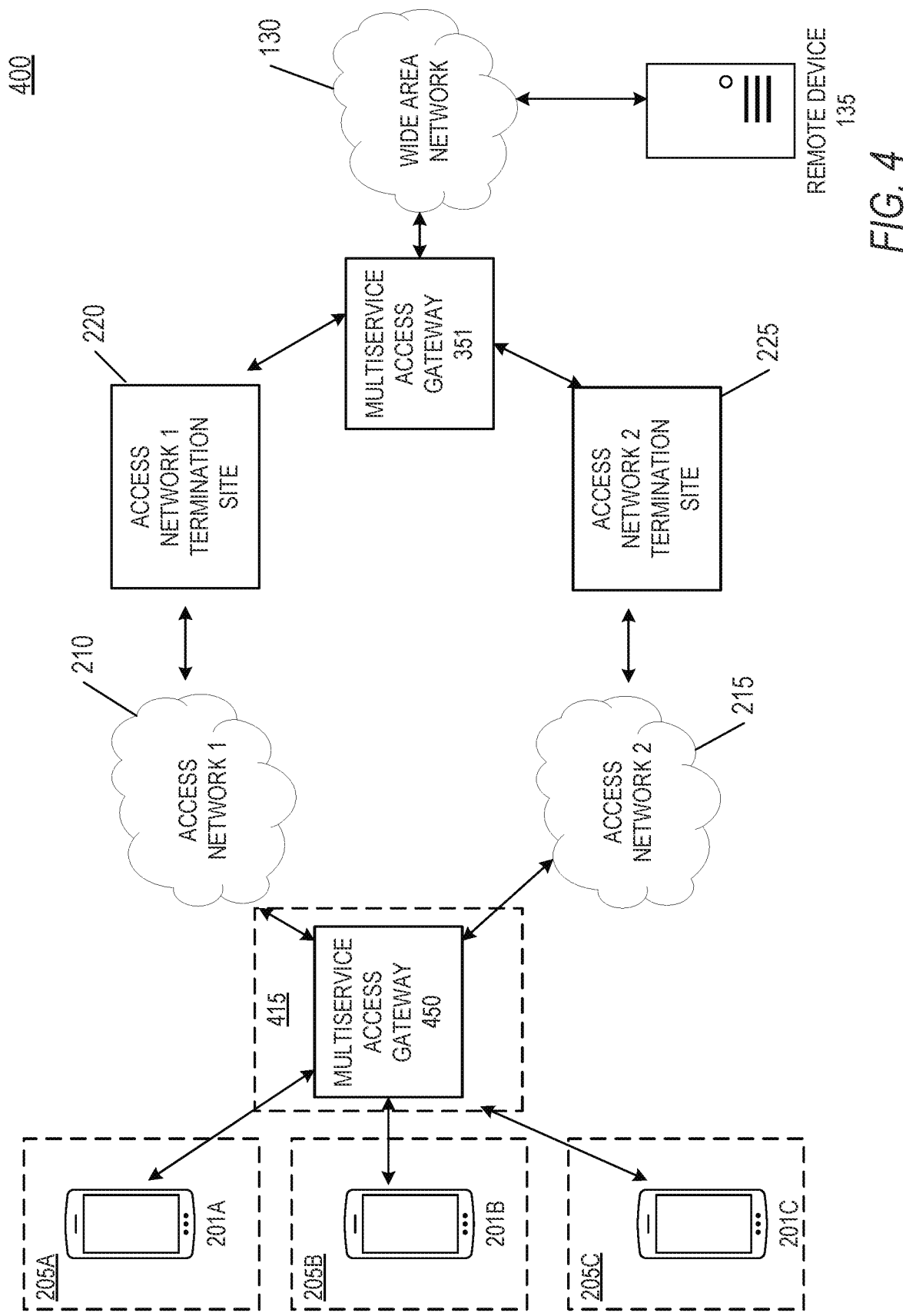
FIG. 4 is a schematic block diagram illustrating an example packet steering system according to some embodiments of the present inventive concepts.

FIG. 4 illustrates an example system 400 in which packets may be steered across multiple access technologies. Present within the system 400 of FIG. 4 is a customer premises multiservice access gateway 450 which is located at a node 415 that services multiple customer premises 205A, 205B, and 205C. Thus, in contrast to the systems 200 and 300 previously discussed, the system 400 may aggregate customer-specific signals received from multiple customer premises 205A, 205B, and 205C and the user devices 201A, 201B, and 201C therein. For example, the customer premises multiservice access gateway 450 may be communicatively coupled to each customer premises via one or more networks, such as a coaxial cable network, a fiber optic cable network, a cellular network, a wireless network (Wi-Fi or WiMAX), or the like. Given that the multiservice access gateway 450 may serve multiple customer premises, in some embodiments the multiservice access gateway 450 may be at a distance geographically proximate to the customer premises 205A-C, or up to 100 miles away depending on network topology.

Figure 10:
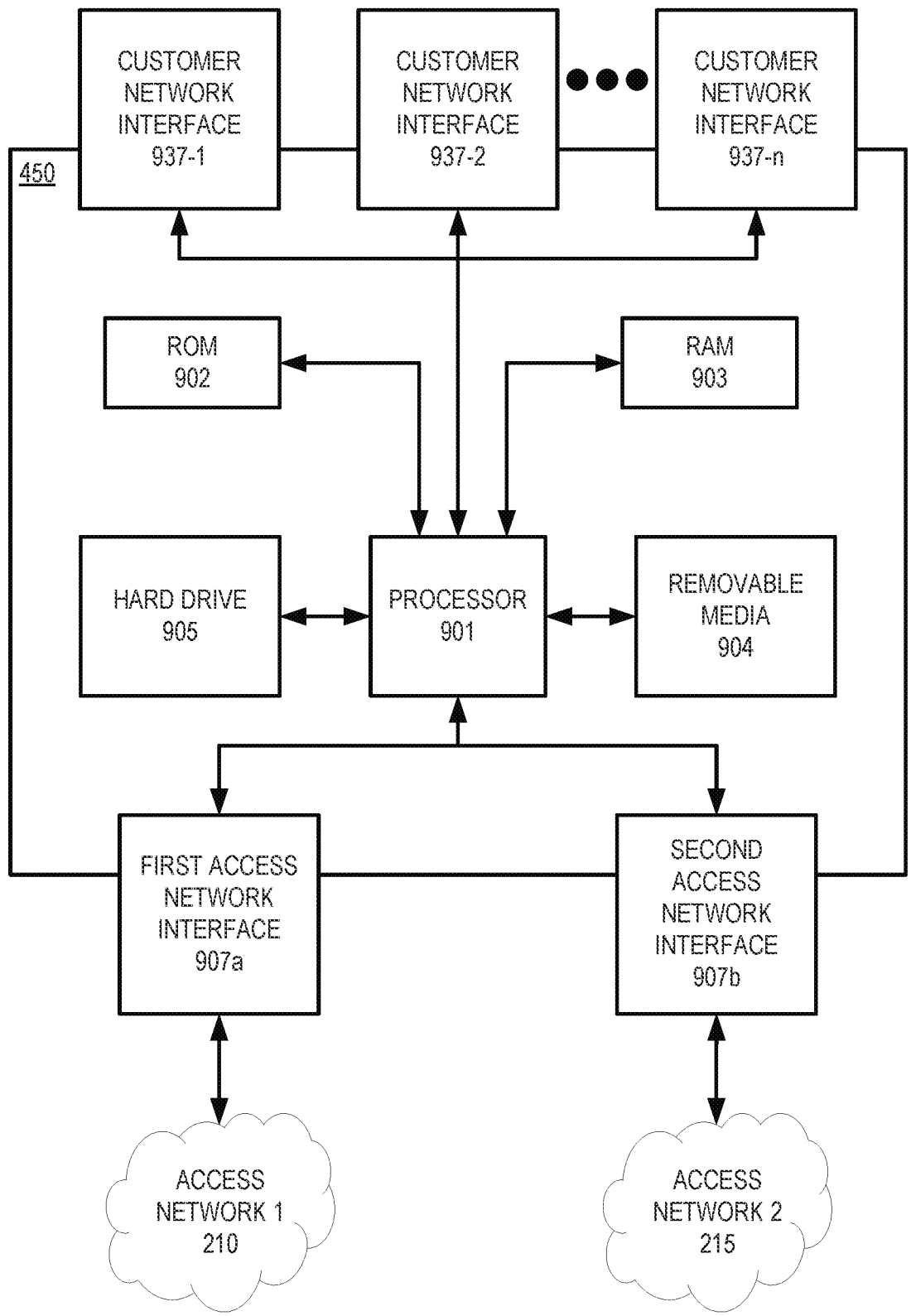
FIG. 10 is a schematic block diagram illustrating components of an example multiservice access gateway according to some embodiments of the present inventive concepts.

FIG. 10 is an example of a customer premises multiservice access gateway 450 which may communicate with equipment at multiple customer premises using customer network interfaces 937-1, 937-2, 937-n. As with the example of FIG. 9A, the customer premises multiservice access gateway 450 may also include a first access network interface 907a and a second access network interface 907b, which may include physical interfaces to the access networks 210 and 215 including physical layer (PHY) semiconductor chips, devices, and/or interfaces. Thus, in some embodiments, the customer premises multiservice access gateway 450 may include interfaces to connect to two or more access networks 210 and 215, which may be e.g., optical (PON and/or AON), coaxial cable, HFC, wireless, cellular, satellite, or any other access network. In some embodiments, the customer premises multiservice access gateway 450 may include physical interfaces to the access networks 210 and 215 including physical layer (PHY) semiconductor chips, devices, and/or interfaces. For example, if one of the access networks 210 and 215 is a coaxial cable network, an input/output of the customer premises multiservice access gateway 450 may be a connector configured to receive a coaxial cable connector. As another example, if one of the access networks is a cellular network, the customer premises multiservice access gateway 450 may include a cellular antenna and radio, which may convert uplink signals to cellular frequencies for transmission via the cellular antenna and may also convert downlink signals received via the cellular antenna from cellular frequencies. The access networks 210 and 215, termination sites 220 and 225, WAN 130 and the remote server 135 are functionally similar to those discussed with reference to FIG. 2, and need not be elaborated upon further herein. Further, as discussed with respect to FIG. 2 and FIG. 9B, in FIG. 4 and FIG. 10, instead of the customer premises multiservice access gateway 450 having HY interfaces with the one or more access networks, in some embodiments the multiservice access gateway 450 may be communicatively coupled to the access networks via other equipment and may appear as a router with multiple WAN ports. In other words, in some embodiments, the inventive concepts of FIG. 9B may be combined with those of FIG. 4 and FIG. 10.

Figure 8:
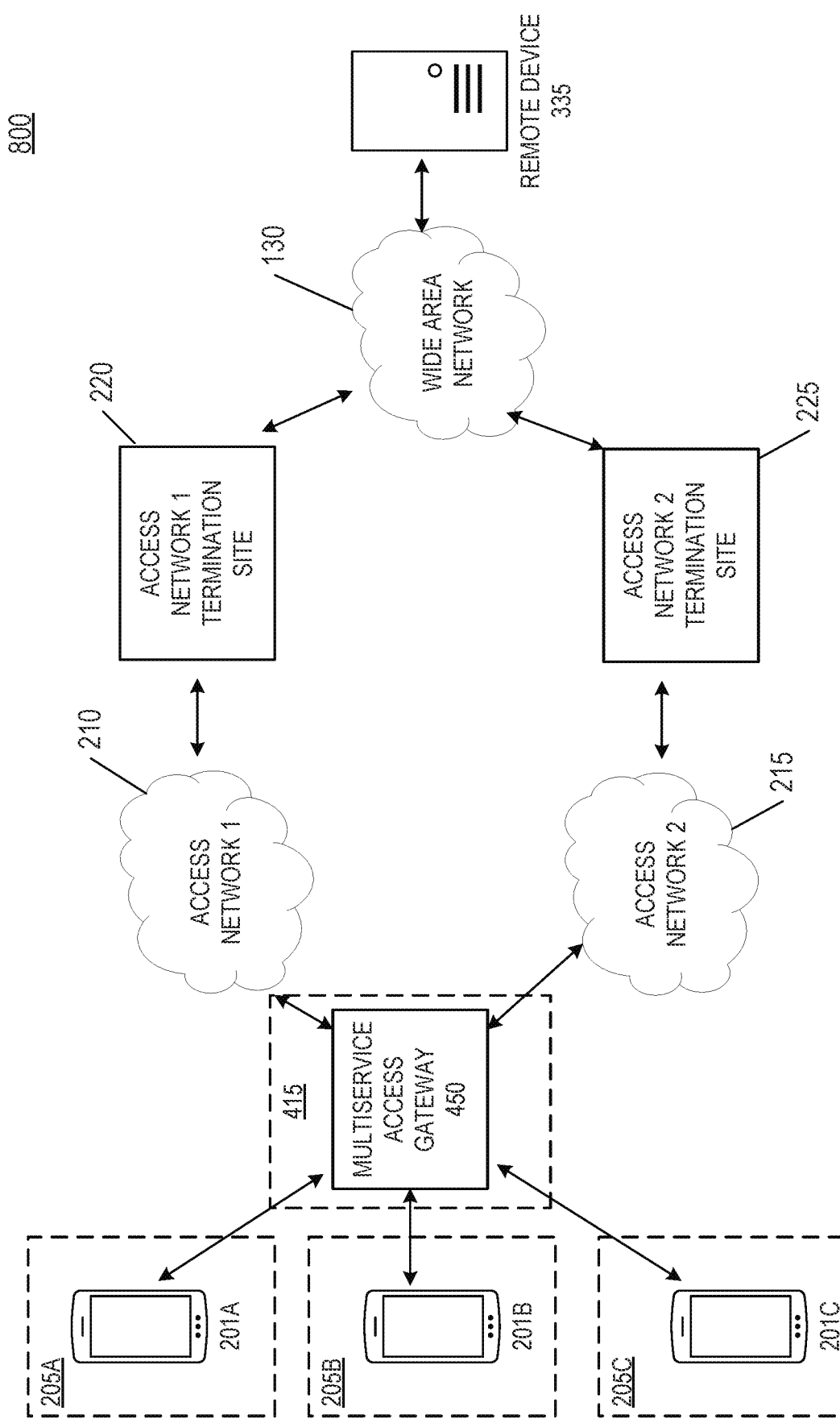
FIG. 8 is a schematic block diagram illustrating an example packet steering system according to some embodiments of the present inventive concepts.

It is contemplated that the customer premises multiservice access gateway 450 may be used in conjunction with the multi-path enabled remote device 335 of FIG. 3, and for completeness, FIG. 8 is included showing a system 800 in which both are present. Discussion of each device of system 800 is similar to that already provided, and is omitted herein for brevity.

Figure 5A:
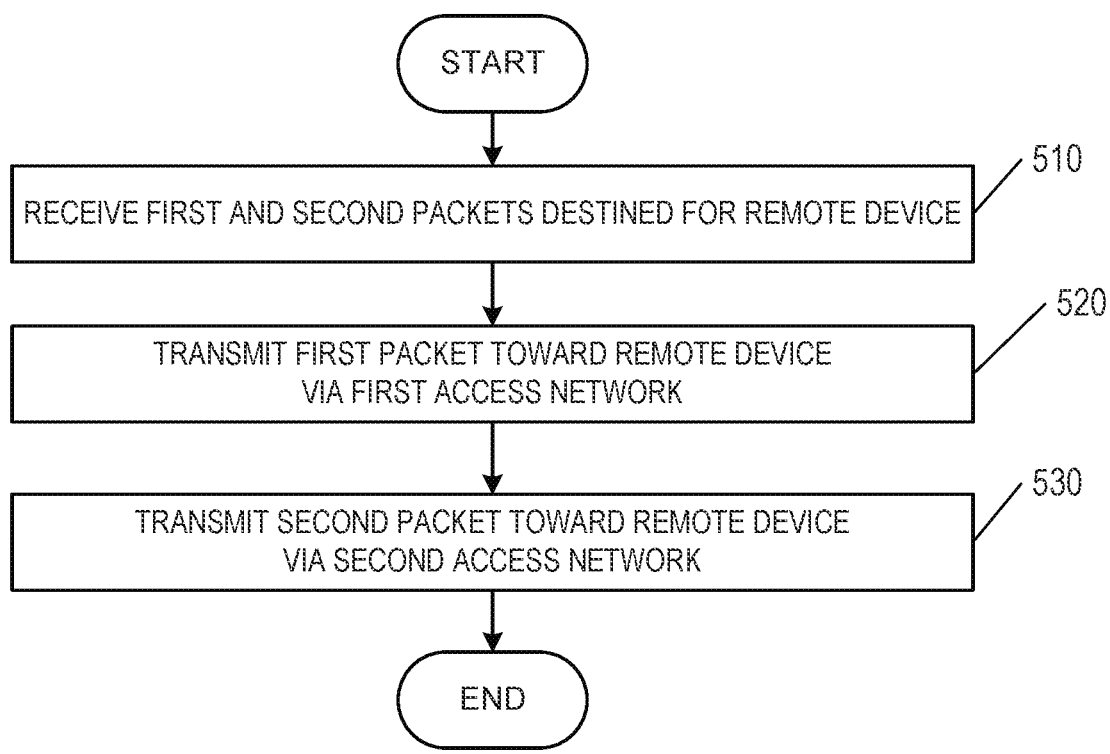
FIGS. 5A, 5B, 6A, and 6B are flowcharts of example packet steering methods according to some embodiments of the present inventive concepts.

Some example methods of using the devices and systems described herein are now provided for context. FIG. 5A illustrates a method 500 of steering packets using, e.g., the multiservice access gateways of FIGS. 2-4 and 8. In FIG. 5A, at operation 510 a device (e.g., the multiservice access gateway 250 of FIG. 2) may receive first and second packets that are destined for a remote device (e.g., the remote server 135 of FIG. 2). The first and second packets may each include a destination address (IP address) identifying the remote device. In operation 520, the multiservice access gateway 250 may transmit the first packet toward the remote device via a first access network (e.g., the first access network 210) and in operation 530 the multiservice access gateway 250 may transmit the second packet toward the remote device 130 via the second access network (e.g., the second access network 215). In some embodiments, as discussed above, the multiservice access gateway 250 may access the first and second access networks via network interfaces of the multiservice access gateway 250. In some embodiments, the multiservice access gateway 250 may transmit to the first and second access networks via network interfaces of other devices, such as cable modems or other CPE. A corresponding method in which the first and second packets are received from the remote device and transmitted to a user device is also supported by the present disclosure.

Figure 5B:
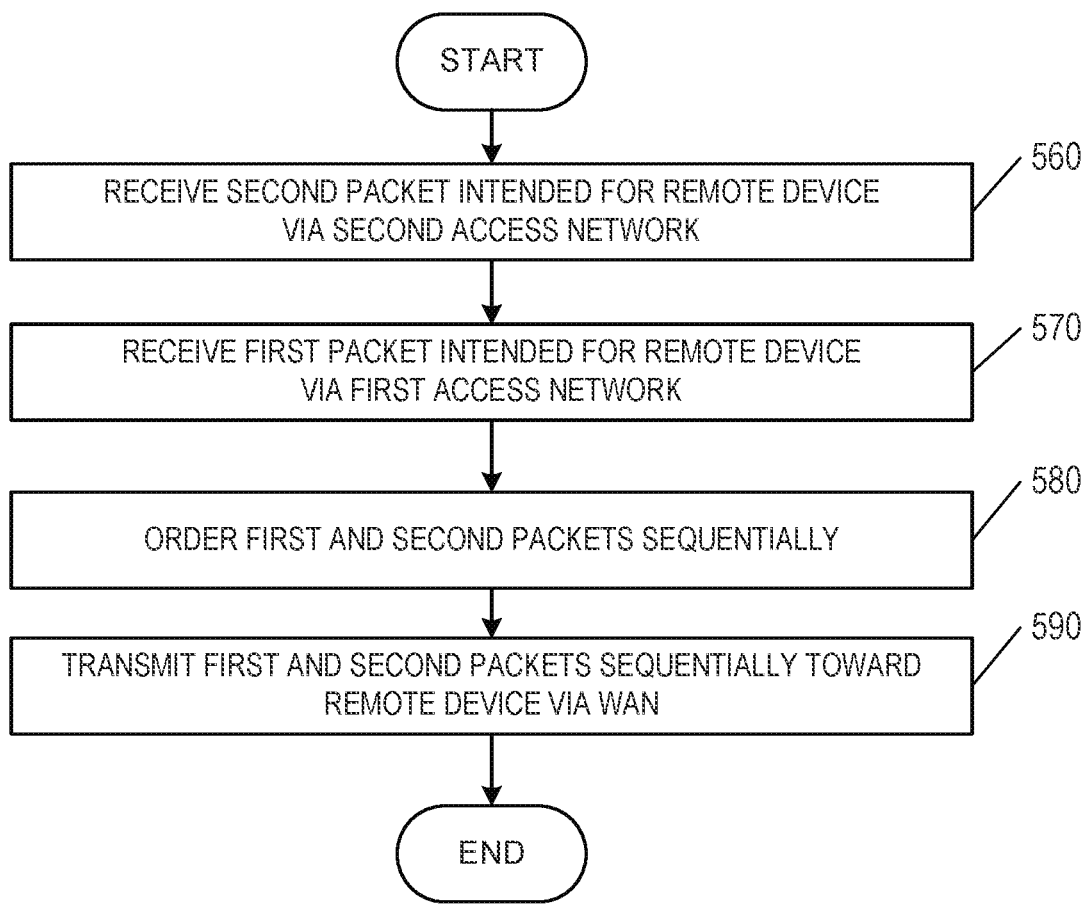

FIG. 5B illustrates another method 550 of steering packets using e.g., a multiservice access gateway (e.g., multiservice access gateway 250 of FIG. 2, multiservice access gateway 351 of FIG. 3 or FIG. 8). In operation 560, a second packet intended for a remote device (e.g., the remote server 135 of FIG. 2) may be received via a second access network. In operation 570, a first packet intended for the remote device may be received via a first access network. The multiservice access gateway 250, 351 may recognize that the second and first packets were received out of order, and may order the first and second packets sequentially in operation 580. In operation 590, the first and second packets, now in sequential order, may be transmitted toward the remote device via a wide area network (WAN). A corresponding method in which the first and second packets are received from the remote device and transmitted to a user device is also supported by the present disclosure.

Figure 6A:
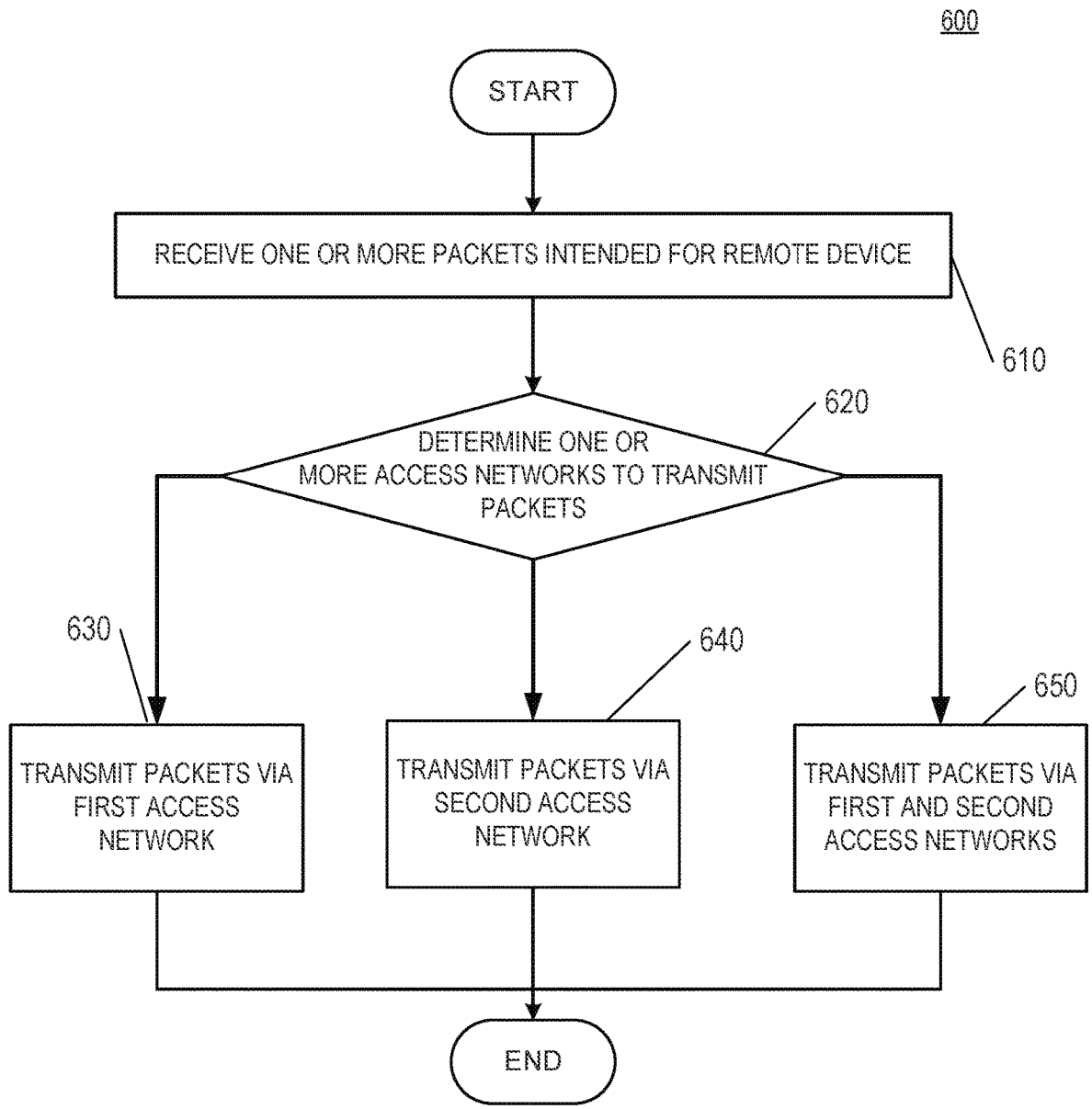

FIG. 6A illustrates another method 600 of steering packets using, e.g., the multiservice access gateways of FIGS. 2-4 and 8. In operation 610, one or more packets intended for a remote device may be received by, e.g., a multiservice access gateway. The multiservice access gateway may determine, in operation 620, one or more access networks over which the one or more packets may be transmitted. As discussed above, this determination may be made based on data received from the access networks, data received from devices at customer premises, and/or data received from a scheduler. Based on the results of the determination at operation 620, the packets may be transmitted via a first access network in operation 630, or transmitted via a second access network in operation 640, or transmitted via the first and second access networks in operation 650. For example, the packets may be split into two portions and each portion of packets may be transmitted via separate access networks.

In some embodiments, and as may be contemplated by FIG. 6A and operation 650 therein, a packet may be duplicated and transmitted in parallel via both of the first and second access networks. This may provide, e.g., redundancy across the multiple access networks. If both packets are received at the destination, one may be discarded in favor of the other.

Figure 6B:
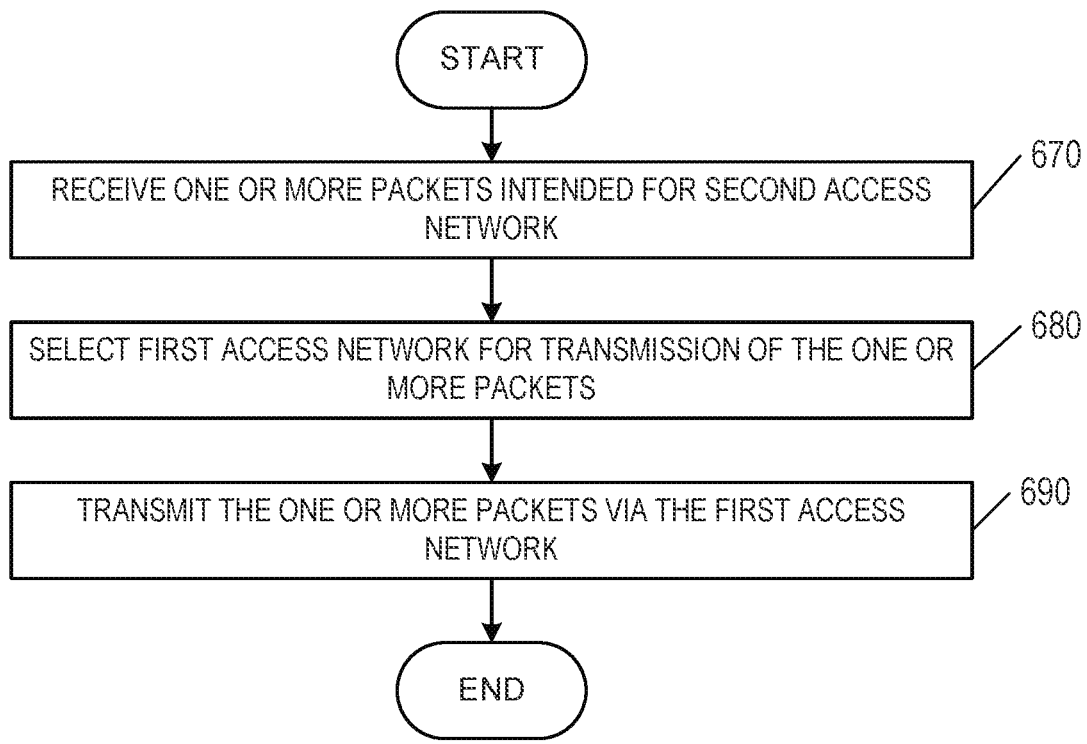

FIG. 6B illustrates another method 660 of steering packets using, e.g., the multiservice access gateways of FIGS. 2-4 and 8. In operation 670, one or more packets may be received by a multiservice access gateway that are intended for transmission via a second access network. In operation 680, the multiservice access gateway may select a first access network instead of the second access network for transmission of the one or more packets. For example, this selection may be made based on data received from the access networks, data received from devices at customer premises, and/or data received from a scheduler. In operation 690, the one or more packets may be transmitted via the first access network instead of the intended second access network.

Figure 7:
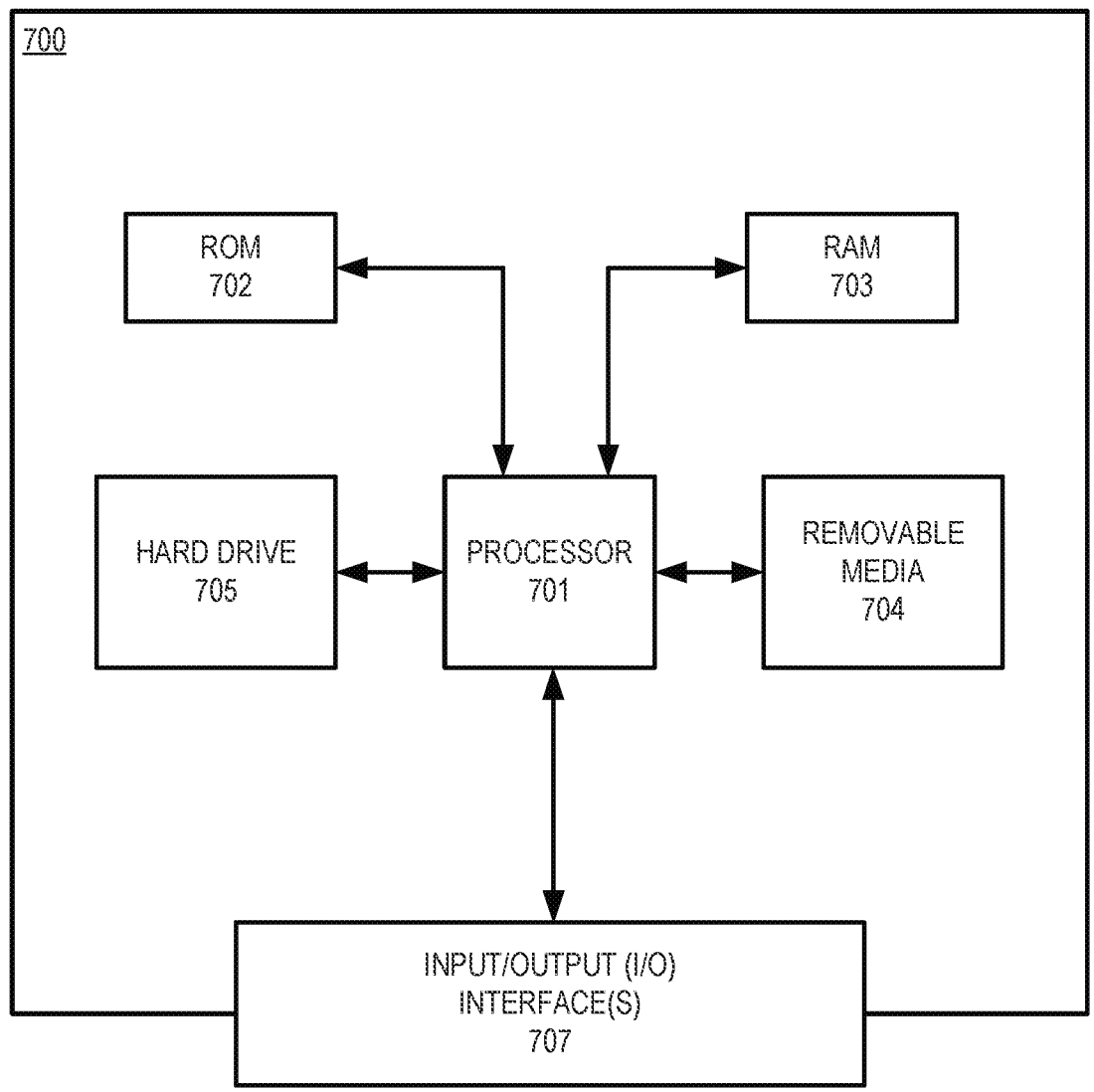
FIG. 7 is a schematic block diagram illustrating components of a computing device that may be used to implement one or more components within a packet steering system according to some embodiments of the present inventive concepts.

FIG. 7 illustrates various components of a computing device 700 which may be used to implement one or more of the devices herein, including the user devices 201 and the remote devices 135 and 335. Some components of the computing device 700 may overlap with those of the multiservice access gateways 250, 351, and 450 of FIGS. 2-4 and 8 already discussed herein, but are discussed here generically for completeness. FIG. 7 illustrates hardware elements that can be used in implementing any of the various computing devices discussed herein. In some aspects, general hardware elements may be used to implement the various devices discussed herein, and those general hardware elements may be specially programmed with instructions that execute the algorithms discussed herein. In special aspects, hardware of a special and non-general design may be employed (e.g., ASIC or the like). Various algorithms and components provided herein may be implemented in hardware, software, firmware, or a combination of the same.

A computing device 700 may include one or more processors 701, which may execute instructions of a computer program to perform any of the features described herein. The instructions may be stored in any type of computer-readable medium or memory, to configure the operation of the processor 701. For example, instructions may be stored in a read-only memory (ROM) 702, random access memory (RAM) 703, removable media 704, such as a Universal Serial Bus (USB) drive, compact disk (CD) or digital versatile disk (DVD), floppy disk drive, or any other desired electronic storage medium. Instructions may also be stored in an attached (or internal) hard drive 705. The computing device 700 may be configured to provide output to one or more output devices (not shown) such as printers, monitors, display devices, and so on, and receive inputs, including user inputs, via input devices (not shown), such as a remote control, keyboard, mouse, touch screen, microphone, or the like. The computing device 700 may also include input/output interfaces 707 which may include circuits and/or devices configured to enable the computing device 700 to communicate with external input and/or output devices on a unidirectional or bidirectional basis. The components illustrated in FIG. 7 (e.g., processor 701, ROM storage 702) may be implemented using basic computing devices and components, and the same or similar basic components may be used to implement any of the other computing devices and components described herein. For example, the various components herein may be implemented using computing devices having components such as a processor executing computer-executable instructions stored on a computer-readable medium, as illustrated in FIG. 7.

The inventive concepts provided by the present disclosure have been be described above with reference to the accompanying drawings and examples, in which examples of embodiments of the inventive concepts are shown. The inventive concepts provided herein may be embodied in many different forms than those explicitly disclosed herein, and the present disclosure should not be construed as limited to the embodiments set forth herein. Rather, the examples of embodiments disclosed herein are provided so that this disclosure will be thorough and complete, and will fully convey the scope of the inventive concepts to those skilled in the art. Like numbers refer to like elements throughout.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Some of the inventive concepts are described herein with reference to block diagrams and/or flowchart illustrations of methods, apparatus (systems) and/or computer program products, according to embodiments of the inventive concepts. It is understood that one or more blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the inventive concepts may be embodied in hardware and/or in software (including firmware, resident software, micro-code, etc.). Furthermore, embodiments of the present inventive concepts may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory such as an SD card), an optical fiber, and a portable compact disc read-only memory (CD-ROM).

The terms first, second, etc. may be used herein to describe various elements, but these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items. As used herein, the singular forms "a", "an" and "the" are intended to include the plural forms as well, unless the context clearly indicates otherwise. It should be further understood that the terms "comprises," "comprising," "includes," and/or "including" when used herein, specify the presence of stated features, operations, elements, and/or components, but do not preclude the presence or addition of one or more other features, operations, elements, components, and/or groups thereof.

When an element is referred to as being "on" another element, it can be directly on the other element or intervening elements may also be present. In contrast, when an element is referred to as being "directly on" another element, there are no intervening elements present. When an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the present disclosure.

Aspects and elements of all of the embodiments disclosed above can be combined in any way and/or combination with aspects or elements of other embodiments to provide a plurality of additional embodiments. Although a few exemplary embodiments of the inventive concepts have been described, those skilled in the art will readily appreciate that many modifications are possible in the exemplary embodiments without materially departing from the novel teachings and advantages of the inventive concepts provided herein. Accordingly, all such modifications are intended to be included within the scope of the present application as defined in the claims.

What is claimed is:

1. A method of a multiservice access gateway for servicing one or more user devices at a plurality of customer premises comprising:
receiving, from a user device of the one or more user devices, a plurality of packets destined for a remote device connected to a wide area network (WAN), wherein the multiservice access gateway is connected to the remote device via a plurality of access networks connected to an additional multiservice access gateway that is connected to the remote device via the WAN, wherein the plurality of access networks have at least one respective access network termination site configured to convert signals from carriage over a respective one of the plurality of access networks to one or more signals for carriage over the WAN and from carriage over the WAN to the respective one of the plurality of access network;
selecting a network interface, between at least two network interfaces of the plurality of network interfaces associated with different access networks, of the multiservice access gateway based on any of information actively received or predicted from an analysis of data received from the different access networks, a schedule, information regarding an application, a status, or a usage of data, or any combination thereof; and
delivering the plurality of packets to the remote device via the selected network interface.

2. The method of claim 1, where the analysis uses information received from a source other than the received plurality of packets destined for the remote device.

3. The method of claim 1, where the analysis produces a schedule over a future interval used to allocate the plurality of packets among the at least two network interfaces.

4. The method of claim 1, wherein the at least two network interfaces comprises a first network interface and a second network interface.

5. The method of claim 4, wherein the first network interface comprises a coaxial cable connector, and wherein the second network interface comprises a cellular antenna and radio.

6. The method of claim 1, wherein the user device is located within a premises.

7. The method of claim 1, wherein the user device is located within a premises, and wherein the multiservice access gateway is communicatively coupled to user devices within the premises and to user devices within a different premises.

8. The method of claim 1, wherein the multiservice access gateway enables the user device that is not multi-path transmission control protocol (TCP) enabled to communicate with the remote device that is multi-path TCP enabled using a multi-path TCP connection managed and terminated by the multiservice access gateway.

9. A multiservice access gateway for servicing one or more user devices at a plurality of customer premises, comprising:
   a first network interface configured to connect to a first access network of the plurality of access networks of a first type;
   a second network interface configured to connect to a second access network of the plurality of access networks of a second type; and
   a processor configured to steer a first packet received from a user device of the one or more user devices destined for a remote device connected to a wide area network (WAN) to the first access network, and configured to steer a second packet destined for the remote device to the second access network;
      wherein the multiservice access gateway is connected to the remote device via plurality of access networks connected to an additional multiservice access gateway that is connected to the remote device via the WAN, wherein the plurality of access networks have at least one respective access network termination site configured to convert signals from carriage over a respective one of the plurality of access networks to one or more signals for carriage over the WAN and from carriage over the WAN to the respective one of the plurality of access network; and
      wherein the processor steers the first packet and the second packet based on an analysis made by the processor, wherein the analysis is based on any of information actively received or predicted from a determination based on any of data from at least the first access network and the second access network, a schedule, information regarding an application, a status, or a usage of data, or any combination thereof.

10. The multiservice access gateway of claim 9, where the analysis produces a schedule over a future interval used to steer the first packet and the second packet.

11. The multiservice access gateway of claim 9, where the information is actively received.

12. A method for a multiservice access gateway for servicing one or more user devices at a plurality of customer premises comprising:
   receiving, by a multiservice access gateway, from a user device of the one or more user devices one or more packets destined for a remote device connected to a wide area network (WAN) to be transmitted via a second access network of a plurality of access networks to which the multiservice access gateway is connected, wherein the multiservice access gateway is connected to the remote device via the plurality of access networks connected to an additional multiservice access gateway that is connected to the remote device via the WAN, wherein the plurality of access networks have at least one respective access network termination site configured to convert signals from carriage over a respective one of the plurality of access networks to one or more signals for carriage over the WAN and from carriage over the WAN to the respective one of the plurality of access network;
   selecting, by the multiservice access gateway, a first network interface associated with a first access network of the plurality of access networks to which the multiservice access gateway is connected instead of a second network interface associated with the second access network, wherein the first network interface and the second network interface are different network interfaces of different access networks; and
   transmitting the one or more packets via the first access network instead of the second access network based on any of information actively received or predicted from an analysis of data received from the different access networks, a scheduling, information regarding an application, a status, or a usage of data, or any combination thereof, after applying forward error correction to the one or more packets, and in a different manner than applied to the one or more packets transmitted via the second access network.

13. The method of claim 12, wherein the first access network is a cellular network.

14. The method of claim 13, wherein the second access network comprises a fiber optic network.

15. The method of claim 12, wherein the selecting of the first access network is based on data received via one or more of the first access network and the second access network.

16. The method of claim 12, wherein the selecting of the first access network is based on a prediction made with respect to congestion in the second access network.

17. The method of claim 12, wherein the selecting of the first access network is based on a prediction made that a data transmission rate in the second access network is below a predetermined threshold.

18. The method of claim 12, wherein selecting of the first access network is based on data indicating a type of responsive packet expected from the remote device.

\* \* \* \* \*